United States Patent
Chang et al.

(10) Patent No.: US 6,917,398 B2
(45) Date of Patent: Jul. 12, 2005

(54) DISPLAY UTILIZING CHOLESTERIN LIQUID CRYSTAL POLYMER FOR ENHANCING CONTRAST

(75) Inventors: Shu-Wen Chang, Nantou (TW); Wen-Jui Liao, Taiping (TW)

(73) Assignee: Wintek Corporation, Taichung (TW)

( * ) Notice: Subject to any disclaimer, the term of this patent is extended or adjusted under 35 U.S.C. 154(b) by 128 days.

(21) Appl. No.: 10/662,287

(22) Filed: Sep. 16, 2003

(65) Prior Publication Data

US 2005/0057719 A1 Mar. 17, 2005

(51) Int. Cl.$^7$ ................................................. G02F 1/13
(52) U.S. Cl. ........................................ 349/69; 313/504
(58) Field of Search ........................... 349/69; 313/504, 313/506

(56) References Cited

U.S. PATENT DOCUMENTS 6,710,541 B2 * 3/2004 He et al. ..................... 313/504
2002/0079831 A1 * 6/2002 He et al. ..................... 313/504
2004/0051445 A1 * 3/2004 Adachi ........................ 313/504
2004/0189167 A1 * 9/2004 Adachi et al. .............. 313/501
2004/0227458 A1 * 11/2004 He et al. ..................... 313/504

* cited by examiner

*Primary Examiner*—James A. Dudek
(74) *Attorney, Agent, or Firm*—Rosenberg, Klein & Lee

(57) ABSTRACT

A display utilizing cholesterin liquid crystal polymer for enhancing contrast includes a transparent substrate on which a bus-bar, an electric hole conductive layer, a lighting layer, an electronic conductive layer and a cathode electrode layer are sequentially overlaid. An insulating packaging layer is disposed on the cathode electrode layer. The electric hole conductive layer is painted with polymer electric hole conductive material and coordinated on the bus-bar. The lighting layer has cholesterin liquid crystal phase and is made on the coordinated electric hole conductive layer. The lighting layer goes through backfire to be arranged into such a structure that the cholesterin liquid crystal lighting molecules can induce and emit manual circular polarized light. A circular polarizing optical coating is attached to one face of the substrate.

7 Claims, 4 Drawing Sheets

DISPLAY UTILIZING CHOLESTERIN LIQUID CRYSTAL POLYMER FOR ENHANCING CONTRAST

BACKGROUND OF THE INVENTION

The present invention is related to a display utilizing cholesterin liquid crystal polymer for enhancing contrast, and more particularly to a display with self-luminous cell. The display includes a lighting layer having cholesterin liquid crystal phase. The lighting layer goes through backfire and is arranged into planer structure to induce and emit manual circular polarized light. The lighting layer cooperates with a circular polarizing optical coating to enhance the contrast and brightness of the display.

The conventional lightweight and small-sized display with self-luminous cell has wider vision angle. Such display can be made on a soft substrate. FIG. 5 shows the structure of the self-luminous cell. An ITO bus-bar 81 is overlaid on a transparent substrate 8. An electric hole conductive layer 82 is overlaid on the ITO bus-bar 81. A lighting layer 83 is overlaid on the electric hole conductive layer 82. An electronic conductive layer 84 is overlaid on the lighting layer 83. A cathode electrode layer 85 is overlaid on the electronic conductive layer 84. An insulating packaging layer (not shown) is disposed on the cathode electrode layer 85. When a circuit supplies driving current to the display, by means of the lighting layer 83, the self-luminous cell emits light.

The cathode electrode layer 85 is a metal layer forming a mirror face that tends to reflect the incident light A of the environment as shown in FIG. 6. Accordingly, when the display panel is used outdoors in brighter environment, the cathode electrode layer 85 will reflect the incident light to form environmental reflected light B. The reflected light B will interfere with and affect the displaying effect of the display panel. To solve this problem, generally a black cathode is used. Alternatively, a black layer is disposed between the cathode electrode layer 85 and the lighting layer 83 for absorbing light. Still alternatively, a quarter wavelength phase difference plate or circular polarizing optical coating is laid on the cell to eliminate the interference of the light reflected by the cathode electrode layer 85. However, the reliability of the black cathode will decline with time. With respect to the black layer, the development of the material and practical effect of such material have not yet matured. The phase difference plate utilizes light travel difference of the reflected light to destructively interfere with and eliminate the light. Such measure requires precise control of the distance between the phase difference plate and the cathode electrode layer 85 for eliminating the reflected light. It is quite difficult to perform the manufacturing procedure. Moreover, such measure can hardly cover all visible light wavelengths.

In addition, with respect to the circular polarizing optical coating, the manual circular polarized light in one direction (such as levorotary light) of the environmental incident light will be absorbed by the circular polarizing optical coating, while the manual circular polarized light in another direction (such as dextrorotary light) of the environmental incident light is permitted to penetrate through the circular polarizing optical coating. The penetrating dextrorotary light is reflected by the cathode electrode layer 85 to form levorotary light. When passing through the circular polarizing optical coating, the reflected levorotary light will be further absorbed by the circular polarizing optical coating. Therefore, the cathode reflection interference of the environmental intense light will be eliminated. However, the circular polarizing optical coating will absorb the manual circular polarized light in one direction of the incident light. Therefore, in general, 50% of the light emitted from the self-luminous cell will be also absorbed so that the brightness of the self-luminous cell will be half reduced. This greatly reduces the using efficiency of energy.

SUMMARY OF THE INVENTION

It is therefore a primary object of the present invention to provide a display utilizing cholesterin liquid crystal polymer for enhancing contrast. When using the display outdoors in a brighter environment, the circular polarizing optical coating will first absorbs the incident levorotary light of the environmental incident light and permits the incident dextrorotary light to penetrate through. The penetrating incident dextrorotary light is reflected by the cathode electrode layer to form reflected levorotary light. When the reflected levorotary light passes through the circular polarizing optical coating, the reflected levorotary light is further absorbed by the circular polarizing optical coating. Therefore, the cathode reflection interference of the intense light of the environment will be eliminated to enhance the contrast of the display under intense light of the environment. The manual circular polarized dextrorotary light emitted from the lighting layer will not be absorbed by the circular polarizing optical coating and can totally penetrate through the circular polarized optical coating to enhance the brightness of the display. Accordingly, the using efficiency of the energy is increased and the contrast and brightness of the display are greatly enhanced.

According to the above object, the display includes a transparent substrate and a transparent bus-bar overlaid on the substrate. An electric hole conductive layer is overlaid on the bus-bar. At least one lighting layer is overlaid on the electric hole conductive layer. An electronic conductive layer is overlaid on the lighting layer. A cathode electrode layer is overlaid on the electronic conductive layer. An insulating packaging layer is disposed on the cathode electrode layer. The electric hole conductive layer is painted with polymer electric hole conductive material and coordinated on the bus-bar. The lighting layer has cholesterin liquid crystal phase and is made on the coordinated electric hole conductive layer. The lighting layer goes through backfire to be arranged into such a structure that the cholesterin liquid crystal lighting molecules can induce and emit manual circular polarized light. A circular polarizing optical coating is attached to one face of the substrate.

The present invention can be best understood through the following description and accompanying drawings wherein:

DETAILED DESCRIPTION OF THE PREFERRED EMBODIMENTS

Figure 1:
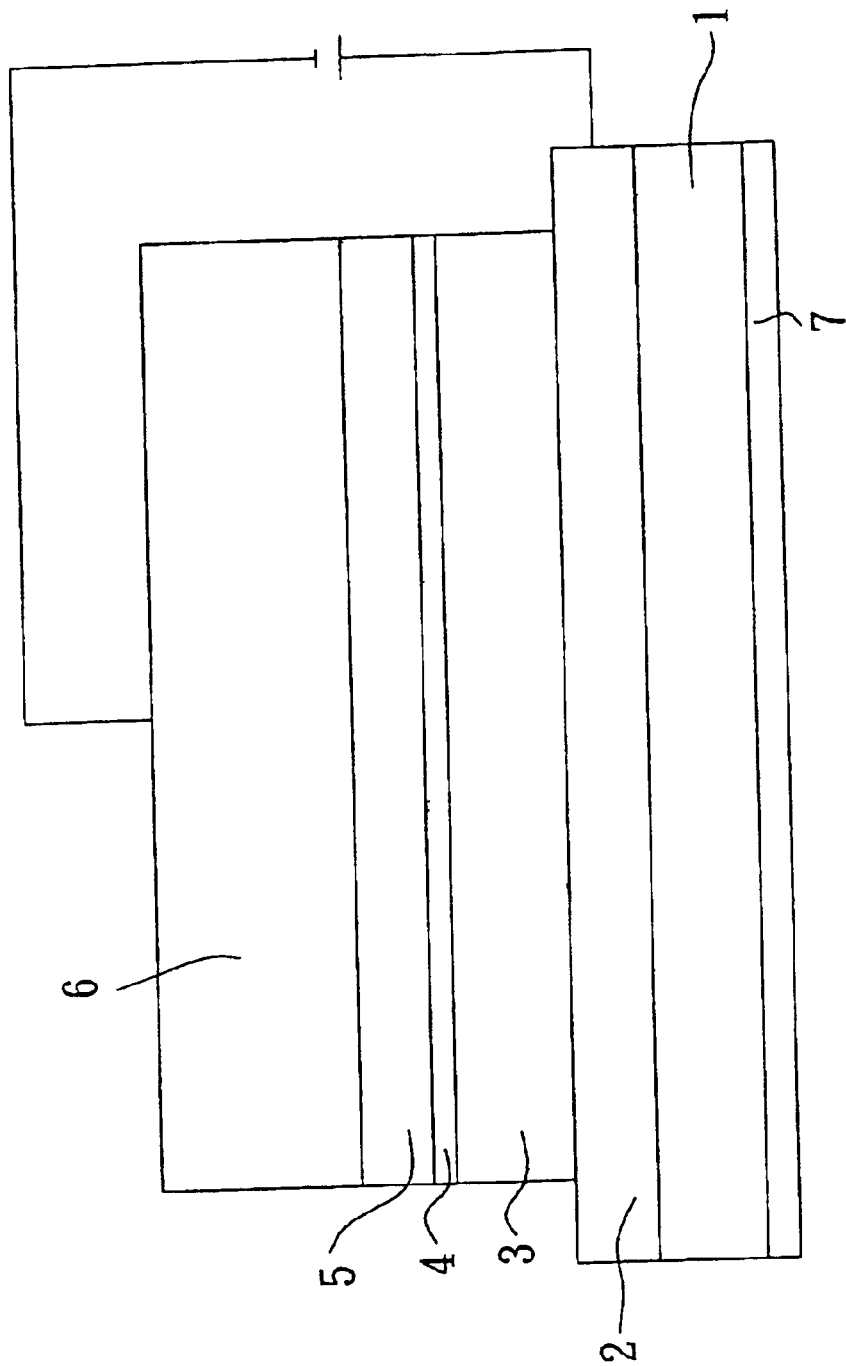
FIG. 1 is a diagram showing the structure of the present invention.
Figure 2:
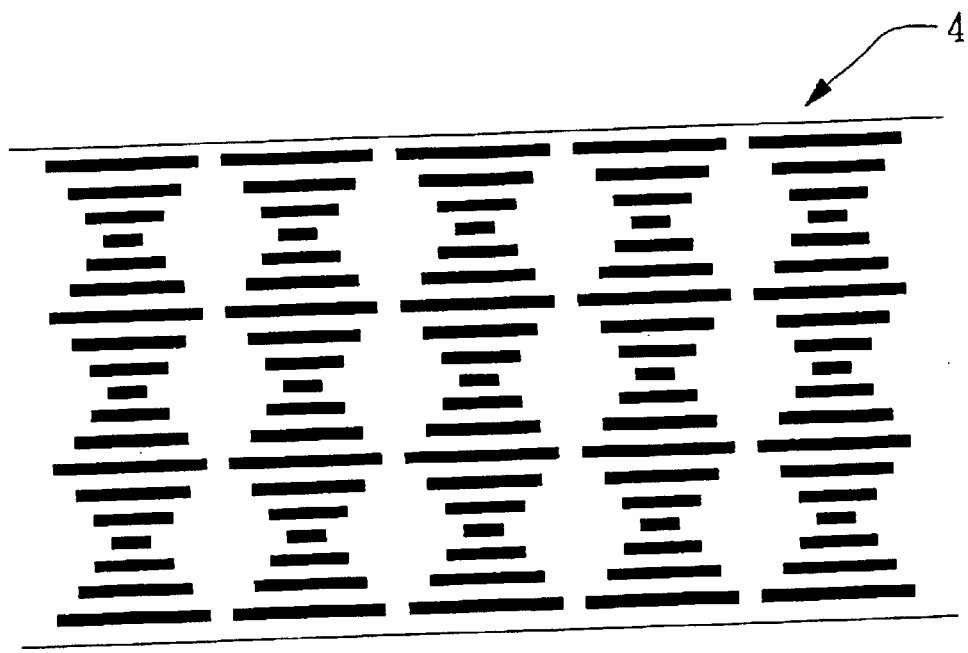
FIG. 2 shows the lighting layer of the present invention, which has cholesterin liquid crystal phase.
Figure 3:
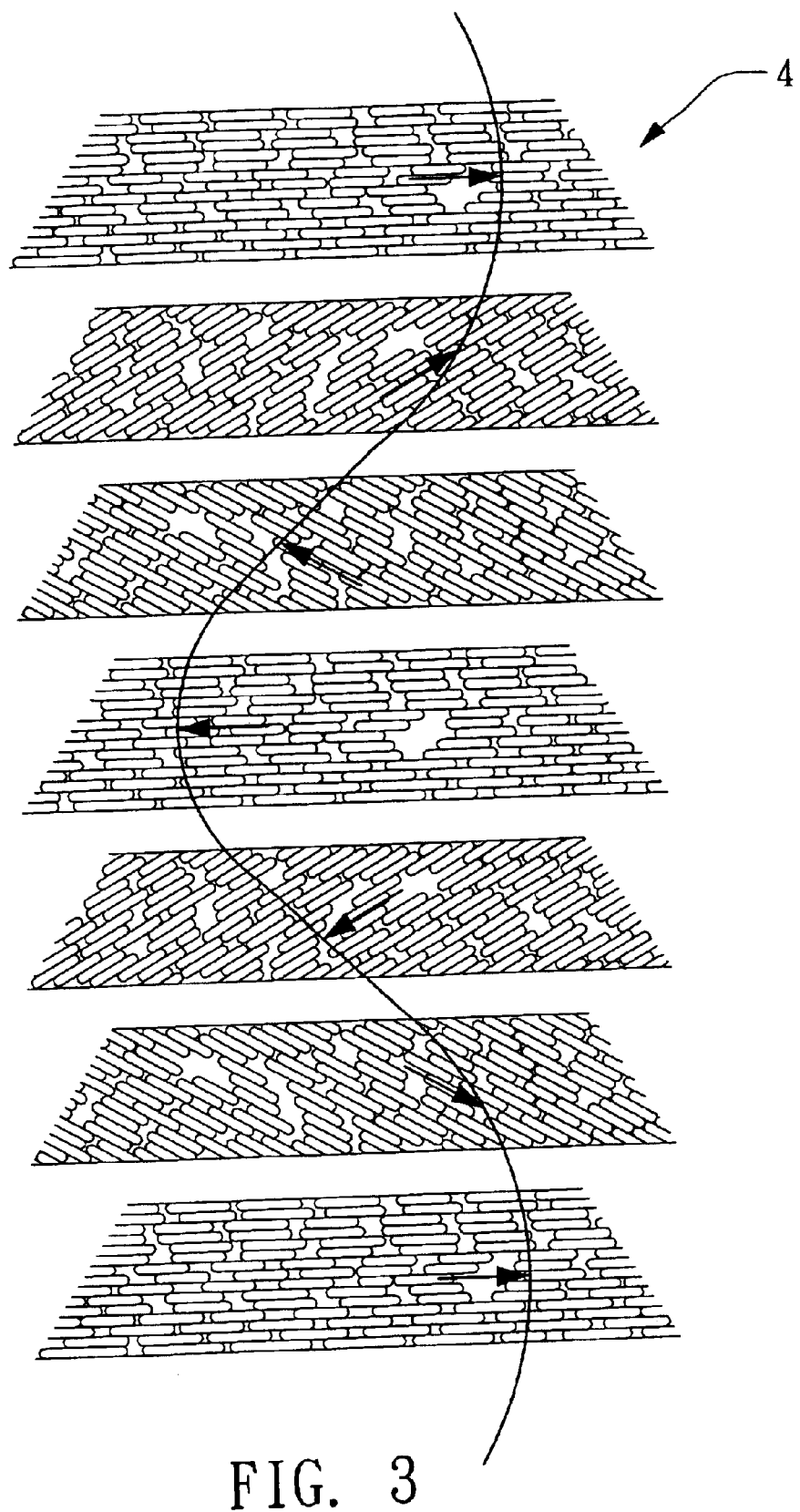
FIG. 3 shows that the lighting layer of the present invention goes through backfire and is arranged into planer structure to emit dextrorotary light.
Figure 5:
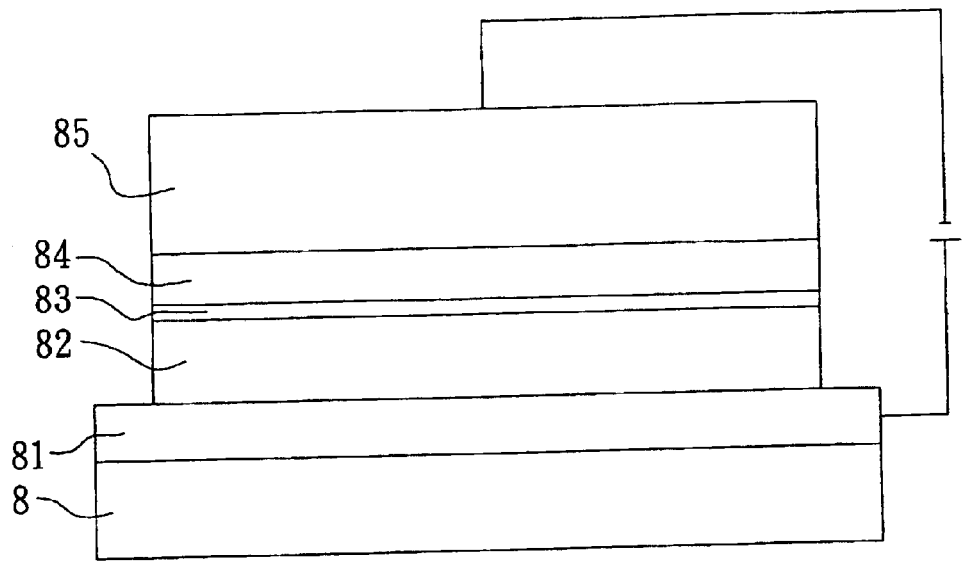
FIG. 5 shows the structure of a conventional display.
Figure 6:
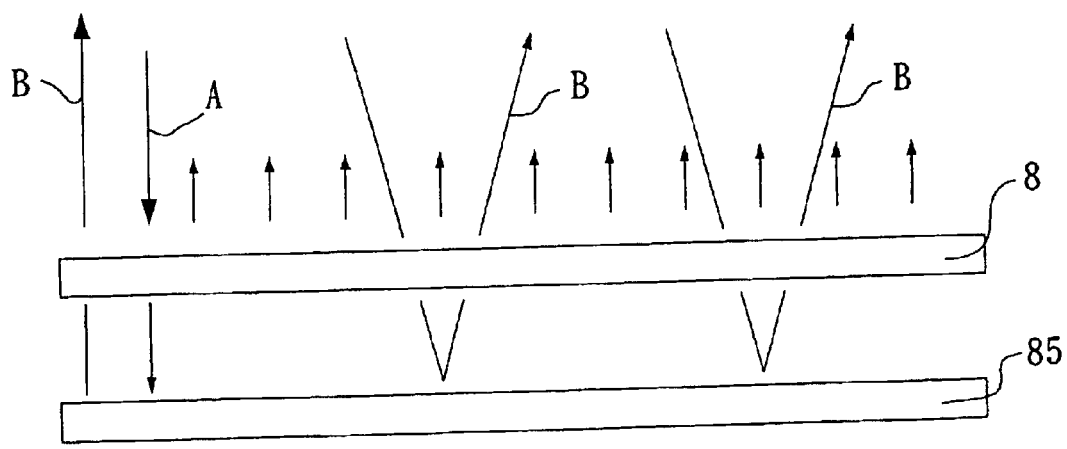
FIG. 6 shows the cathode reflection interference of the conventional display.

Please refer to FIGS. 1 to 3. The present invention provides a display utilizing cholesterin liquid crystal polymer for enhancing contrast. The display includes a transparent substrate 1 and a transparent bus-bar 2 overlaid on the substrate 1. In this embodiment, the substrate 1 is a glass substrate and the bus-bar 2 is an ITO bus-bar. An electric hole conductive layer 3 is overlaid on the bus-bar 2. At least one lighting layer 4 is overlaid on the electric hole conductive layer 3. An electronic conductive layer 5 is overlaid on the lighting layer 4. A cathode electrode layer 6 is overlaid on the electronic conductive layer 5. An insulating packaging layer (not shown) is disposed on the cathode electrode layer 6. When a circuit supplies driving current to the display, by means of the lighting layer 4, the display emits light.

The electric hole conductive layer 3 is painted with polymer electric hole conductive material and coordinated on the bus-bar 2. In this embodiment, the polymer electric hole conductive material is discotic liquid crystals. The electric hole conductive layer 3 is directionally rubbed to have ability to coordinate. The lighting layer 4 has cholesterin liquid crystal phase and is made on the coordinated electric hole conductive layer 3 of discotic liquid crystals. The lighting layer 4 goes through backfire to be arranged into planer structure, whereby the cholesterin liquid crystal lighting molecules can induce and emit manual circular polarized light. In addition, a circular polarizing optical coating 7 is attached to one face of the substrate 1. In this embodiment, the lighting layer 4 emits dextrorotary light and the circular polarizing optical coating 7 is attached to the face of the substrate 1 from which the light goes out.

Figure 4:
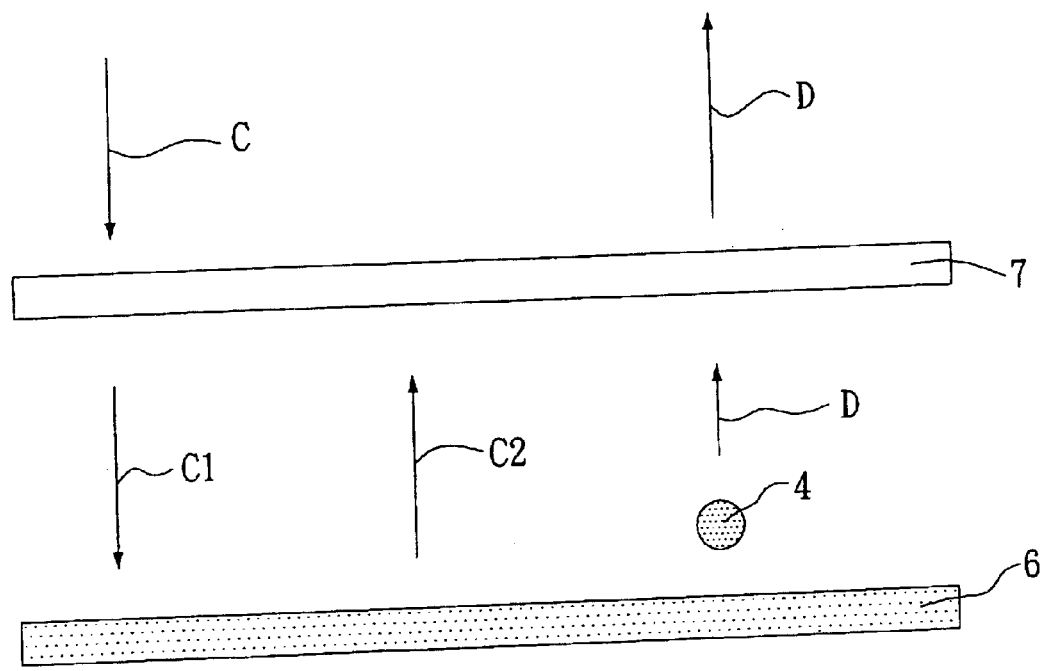
FIG. 4 shows that the cathode reflection interference is eliminated and the brightness is enhanced.

Referring to FIG. 4, when using the display outdoors in a brighter environment, the circular polarizing optical coating 7 will first absorb the incident levorotary light of the environmental incident light C and permit the incident dextrorotary light C1 to penetrate through. The penetrating incident dextrorotary light C1 is reflected by the cathode electrode layer 6 to form reflected levorotary light C2. When the reflected levorotary light C2 passes through the circular polarizing optical coating 7, the reflected levorotary light C2 is further absorbed by the circular polarizing optical coating 7. Therefore, the cathode reflection interference of the intense light of the environment will be eliminated to enhance the contrast of the display under intense light of the environment. The dextrorotary light D emitted from the lighting layer 4 will not be absorbed by the circular polarizing optical coating 7 and can totally penetrate through the circular polarized optical coating 7 to enhance the brightness of the display. Accordingly, the using efficiency of the energy is increased and the contrast and brightness of the display are greatly enhanced.

The above embodiments are only used to illustrate the present invention, not intended to limit the scope thereof. Many modifications of the above embodiments can be made without departing from the spirit of the present invention.

What is claimed is:

1. A display utilizing cholesterin liquid crystal polymer for enhancing contrast, the display comprising a transparent substrate and a transparent bus-bar overlaid on the substrate, an electric hole conductive layer being overlaid on the bus-bar, at least one lighting layer being overlaid on the electric hole conductive layer, an electronic conductive layer being overlaid on the lighting layer, a cathode electrode layer being overlaid on the electronic conductive layer, an insulating packaging layer being disposed on the cathode electrode layer, the electric hole conductive layer being painted with polymer electric hole conductive material and coordinated on the bus-bar, the lighting layer having cholesterin liquid crystal phase and being made on the coordinated electric hole conductive layer, the lighting layer going through backfire to be arranged into such a structure that the cholesterin liquid crystal lighting molecules can induce and emit manual circular polarized light, a circular polarizing optical coating being attached to one face of the substrate.

2. The display utilizing cholesterin liquid crystal polymer for enhancing contrast as claimed in claim 1, wherein the polymer electric hole conductive material is discotic liquid crystals.

3. The display utilizing cholesterin liquid crystal polymer for enhancing contrast as claimed in claim 1, wherein the electric hole conductive layer is directionally rubbed to have ability to coordinate.

4. The display utilizing cholesterin liquid crystal polymer for enhancing contrast as claimed in claim 1, wherein the circular polarizing optical coating is attached to a face of the substrate from which the light goes out.

5. The display utilizing cholesterin liquid crystal polymer for enhancing contrast as claimed in claim 1, wherein the lighting layer goes through backfire to be arranged into planer structure.

6. The display utilizing cholesterin liquid crystal polymer for enhancing contrast as claimed in claim 1, wherein the substrate is a glass substrate.

7. The display utilizing cholesterin liquid crystal polymer for enhancing contrast as claimed in claim 1, wherein the bus-bar is an ITO bus-bar.

* * * * *